US009316839B2

(12) United States Patent
Yun et al.

(10) Patent No.: US 9,316,839 B2
(45) Date of Patent: Apr. 19, 2016

(54) IMAGE SENSOR HAVING IMPROVED LIGHT UTILIZATION EFFICIENCY

(71) Applicant: Samsung Electronics Co., Ltd., Suwon-Si, Gyeonggi-Do (KR)

(72) Inventors: Seokho Yun, Hwaseong-si (KR); Sunghyun Nam, Yongin-si (KR); Sookyoung Roh, Seoul (KR); Changgyun Shin, Anyang-si (KR); Hyungue Hong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/596,585

(22) Filed: Jan. 14, 2015

(65) Prior Publication Data
US 2015/0286059 A1   Oct. 8, 2015

(30) Foreign Application Priority Data

Apr. 3, 2014   (KR) .................. 10-2014-0040066

(51) Int. Cl.
*G02B 3/00* (2006.01)
*G02B 5/20* (2006.01)
*G02B 27/10* (2006.01)
*G02B 5/26* (2006.01)

(52) U.S. Cl.
CPC .......... *G02B 27/1013* (2013.01); *G02B 3/0006* (2013.01); *G02B 5/201* (2013.01); *G02B 5/26* (2013.01)

(58) Field of Classification Search
CPC .................. H01L 27/14627; H01L 27/14621; H01L 27/14623; H01L 27/14645; H01L 27/14643; H01L 27/14689; H01L 27/14625; H01L 27/14603; H01L 27/14607; H01L 31/02327; H01L 27/14605; H01L 27/14868; H01L 27/03; H04N 5/335; H04N 5/372; H04N 9/30; G02B 5/201; G02B 3/0006; G02B 5/20; G02B 6/003; G02B 6/0068; G02B 6/0058; G02B 27/1013; G02B 3/006; G02B 5/26; G02B 5/04
See application file for complete search history.

(56) References Cited

U.S. PATENT DOCUMENTS

| 6,962,414 | B2 | 11/2005 | Roth |
| 8,233,117 | B2 | 7/2012 | Nagata et al. |
| 2005/0213221 | A1 | 9/2005 | Hoshuyama |
| 2007/0221829 | A1 | 9/2007 | Nakagawa et al. |
| 2007/0272829 | A1 | 11/2007 | Nakagawa et al. |
| 2013/0135493 | A1 | 5/2013 | Hiramoto et al. |
| 2013/0181113 | A1* | 7/2013 | Egawa ............ H01L 31/02327 250/208.1 |

FOREIGN PATENT DOCUMENTS

| KR | 1020070067769 B1 | 4/2008 |
| KR | 1020110101835 A | 4/2013 |

* cited by examiner

*Primary Examiner* — Alicia M Harrington
(74) *Attorney, Agent, or Firm* — Harness, Dickey & Pierce

(57) ABSTRACT

At least one example embodiment discloses an image sensor with an improved light utilization efficiency based on reflective color filters. Since the image sensors may use most of an incident light for forming an image by using reflective color filters, light loss due to light absorption may be reduced. Therefore, light utilization efficiency of the image sensors may be improved while embodying color purity.

20 Claims, 6 Drawing Sheets

IMAGE SENSOR HAVING IMPROVED LIGHT UTILIZATION EFFICIENCY

RELATED APPLICATION

This application claims the benefit of Korean Patent Application No. 10-2014-0040066, filed on Apr. 3, 2014, in the Korean Intellectual Property Office, the disclosure of which is incorporated herein in its entirety by reference.

BACKGROUND

1. Field

The present disclosure relates to image sensors, such as image sensors having improved light utilization efficiency based on reflective color filters.

2. Description of the Related Art

A color display apparatus or a color image sensor generally displays images of various colors or detects colors of incident lights by using color filters. In a current color display device or a color image sensor, a RGB color filter mechanism is most popularly employed, in which, for example, green filters are disposed at two pixels from among four pixels and a blue filter and a red filter are respectively disposed at the other two pixels. Furthermore, other than the RGB color filter mechanism, a CYGM color filter mechanism may also be employed, in which cyan, yellow, green, and magenta color filters (complementary colors) are respectively disposed at four pixels.

However, a general absorptive color filter absorbs lights of colors other than a corresponding color, and thus light utilization efficiency may deteriorate. For example, in case of using RGB color filters, only one-third of an incident light is transmitted and two-thirds of the incident light is absorbed, and thus the light utilization efficiency is only about 33%. Therefore, in a color display apparatus or a color image sensor, most light loss occurs in relation to color filters.

Recently, to improve light utilization efficiency of a color display apparatus or a color image sensor, there have been attempts to use a color separation element instead of color filters. A color separation element may separate colors of an incident light by using a diffraction characteristic or a refraction characteristic that differs based on wavelengths, and colors separated by the color separation element may be transmitted to corresponding pixels, respectively. However, a color separation element is still unable to provide images as clear as images provided by using color filters.

SUMMARY

Provided are image sensors with an improved light utilization efficiency based on reflective color filters.

Additional aspects will be set forth in part in the description which follows and, in part, will be apparent from the description, or may be learned by practice of the presented embodiments.

According to an example embodiment, an image sensor includes a color filter array including a plurality of color filters configured to transmit lights of different wavelengths, the plurality of color filters being adjacent to one another, a mirror including a plurality of mirrors facing the color filter array such that reflective surfaces of the plurality of mirrors face toward the color filter array, a plurality of transparent light path changing elements, disposed alternately with the mirrors in the mirror layer, the plurality of transparent light path changing elements configured to tilt a light traveling direction, and a plurality of micro lenses configured to concentrate an incident light onto the plurality of light path changing elements, respectively, wherein the plurality of color filters are configured to transmit lights of corresponding wavelength bands only and reflect lights of other wavelength bands.

Each of the plurality of light path changing elements includes a flat light incident surface and a tilted light emission surface.

The image sensor further includes a transparent first spacer layer between the color filter array and the mirror layer, wherein the plurality of mirrors and the plurality of light path changing elements are on the first spacer layer.

The image sensor further includes a transparent second spacer layer between the mirror layer and the plurality of micro lenses.

The image sensor further includes a plurality of light-absorbing or light-reflecting barriers vertically disposed on a top surface of the color filter array to face the plurality of light path changing elements.

The color filter array includes a first color filter configured to transmit a first wavelength band light only and reflect other wavelength band lights; a second color filter configured to transmit a second wavelength band light only and reflect other wavelength band lights, and a third color filter configured to transmit a third wavelength band light only and reflect other wavelength band lights, and the plurality of first through third color filters are alternately disposed.

A sum of a width of one light path changing element and a width of one mirror is identical to a sum of widths of the first through third color filters.

Each of the light path changing elements is shifted by about half of one pixel width with respect to a correspond color filter.

Each of the light path changing elements faces the center portion of a corresponding micro lens and partially overlaps a first color filter and a third color filter.

Each of the micro lenses is shifted by a distance that is 1.5 times of a pixel width with respect to a corresponding color filter.

Two opposite ends of each of the micro lenses extends to the centers of two different second color filters.

The color filter array includes a plurality of pixel rows in which the plurality of first through third color filters are alternately disposed, and two pixel rows adjacent to each other are shifted by about half of one pixel width with respect to each other.

The color filter array includes a first pixel row including a plurality of first color filters configured to transmit a first wavelength band light only and reflect other wavelength band lights and a first plurality of second color filters configured to transmit a second wavelength band light only and reflect other wavelength band lights the first color filters the first plurality of the first and second color filters alternating in the first pixel row, and a second pixel row including a second plurality of second color filters configured to transmit a second wavelength band light only and reflect other wavelength band lights and a plurality of third color filters configured to transmit a third wavelength band light only and reflect other wavelength band lights, the second plurality of second color filters and the third color filters alternating in the second pixel row.

Each of the light path changing elements is shifted by about half of one pixel width with respect to a corresponding color filter, and each of the micro lenses is shifted by about one pixel width with respect to a corresponding color filter.

Each of the light path changing elements partially overlaps one of the second color filters and one of the first color filters at the first pixel row, and each of the light path changing elements partially overlaps one of the second color filters and one of the third color filters at the second pixel row.

Each of the micro lenses covers a second color filter and a first color filter at the first pixel row, and each of the micro lenses covers one of the second color filters and one of the third color filters at the second pixel row.

The light path changing element and the micro lens of the first pixel row are disposed to be alternated with the light path changing element and the micro lens of the second pixel row.

The pixel array includes at least two types of pixel pattern structures in which the plurality of color filters are in different patterns.

The color filter array includes a first pixel row includes a first plurality of first color filters configured to transmit a first wavelength band light only and reflect other wavelength band lights, a first plurality of second color filters configured to transmit a second wavelength band light only and reflect other wavelength band lights, and a first plurality of third color filters configured to transmit a third wavelength band light only and reflect other wavelength band lights, the first pluralities of first, second and third color filters alternating, a second pixel row including a second plurality of first color filters and a second plurality of second color filters alternating, and a third pixel row including a third plurality of second color filters and a second plurality of third color filters alternating.

Size of micro lenses disposed at the first pixel row is different from size of micro lenses disposed at the second pixel row and the third pixel row.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
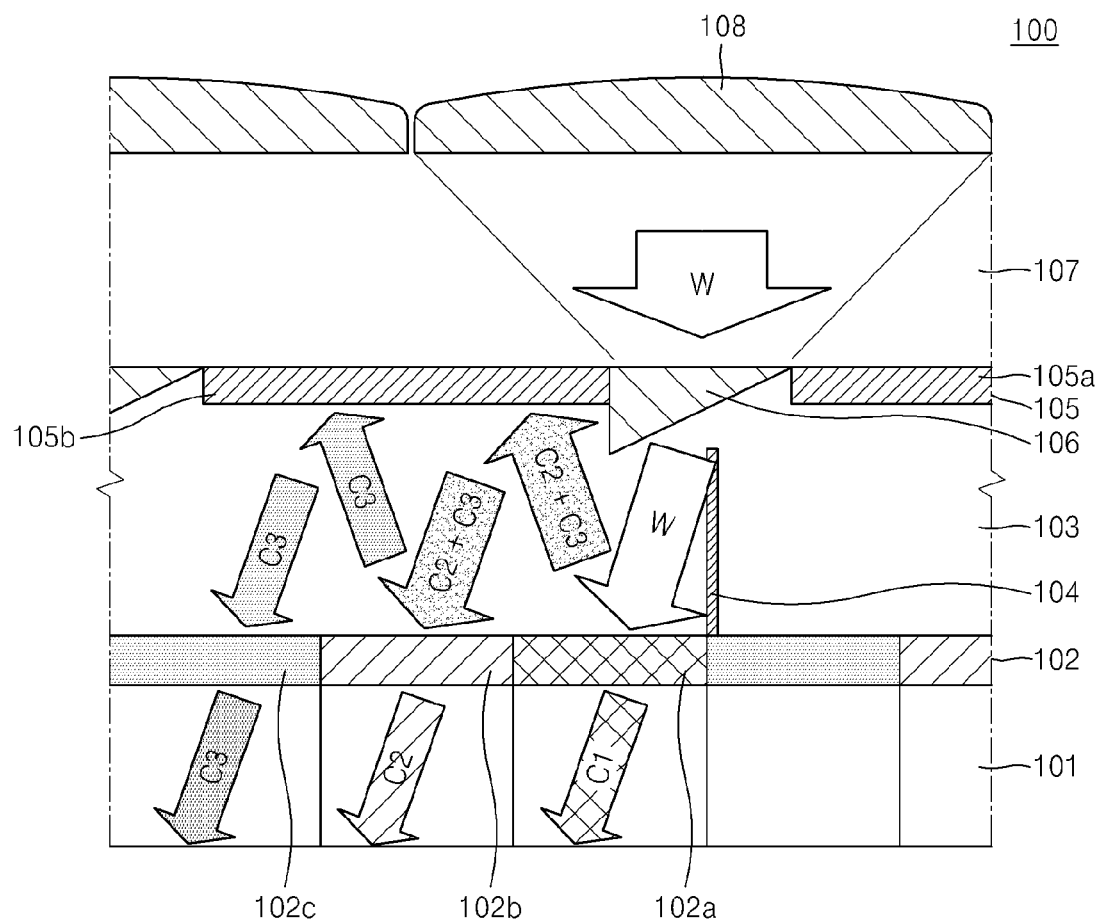
FIG. 1 is a schematic sectional diagram showing the pixel structure of an image sensor according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. It will also be understood that when a layer is referred to as being "on" another layer or substrate, it can be directly on the other layer or substrate, or intervening layers may also be present FIG. 1 is a schematic sectional diagram showing the pixel structure of an image sensor 100 according to an example embodiment. Referring to FIG. 1, the image sensor 100 according to the present embodiment may include a plurality of photo detectors 101 arranged adjacent to one another, a color filter array 102 including a plurality of color filters 102a, 102b, and 102c that are respectively disposed on light incidence surfaces of the plurality of photo detectors 101, a mirror layer 105 disposed to face the color filter array 102, a transparent light path changing element 106 disposed in the mirror layer 105 to tilt a light traveling path, and a micro lens 108 for concentrating incident light onto the light path changing element 106. Here, the mirror layer 105 may be disposed, such that a reflective surface for reflecting light faces toward the color filter array 102.

The photo detector 101 converts incident light into electric signals based on intensity of the incident light. For example, the photo detector 101 may include a charge-coupled device (CCD) sensor or a complementary metal-oxide semiconductor (CMOS) sensor. The plurality of photo detectors 101 may be arranged in the shape of a two-dimensional (2D) matrix including a plurality of rows and a plurality of columns.

The plurality of color filters 102a, 102b, and 102c of the color filter array 102 may be disposed in correspondence to the plurality of photo detectors 101, respectively. Therefore, the one photo detector 101 and one of the color filters 102a, 102b, and 102c may be disposed in one pixel of the image sensor 100. According to the present embodiment, each of the color filters 102a, 102b, and 102c may be a reflective color filter which transmits light of a particular wavelength and reflects light of other wavelengths. For example, the first color filter 102a may transmit a first wavelength band light C1 only and reflect other wavelength band lights C2 and C3. Furthermore, the second color filter 102b may transmit a second wavelength band light C2 only and reflect other wavelength band lights C1 and C3. In the same regard, the third color filter 102c may transmit a third wavelength band light C3 only and reflect other wavelength band lights C1 and C2. For example, the first wavelength band light C1 may be red light, the second wavelength band light C2 may be green light, and the third wavelength band light C3 may be blue light.

The light path changing element 106 may change a direction in which an incident light travels, such that light concentrated by the micro lens 108 is incident to the first color filter 102a at a tilted angle. Therefore, the light path changing element 106 may be formed, such that a light incidence surface facing the micro lens 108 is flat and a light exit surface facing the color filter array 102 is tilted. Although FIG. 1 shows an example in which the light path changing element 106 is provided as one right-angled prism, the present embodiment is not limited thereto. For example, the light path changing element 106 may be a prism array in which a plurality of prisms are 1-dimensionally or 2-dimensionally disposed, may be a diffraction grating including a plurality of fine diffraction surfaces, or may be any other forms for changing a direction of an incident light toward the first color filter 102a.

The light path changing element 106 may be disposed in the mirror layer 105. In other words, the plurality of light path changing elements 106 and a plurality of mirrors 105a and 105b may be alternately disposed in the mirror layer 105. Although FIG. 1 shows that the light path changing element 106 and the mirrors 105a and 105b are disposed in one same layer, that is, the mirror layer 105, the light path changing element 106 and the mirrors 105a and 105b may be disposed in different layers. For example, the light path changing element 106 and the mirrors 105a and 105b may be disposed at different heights, such that steps are formed between the light path changing element 106 and the mirrors 105a and 105b. Furthermore, to maintain a constant distance between the color filter array 102 and the mirror layer 105, a first spacer layer 103 may be disposed between the color filter array 102 and the mirror layer 105. Therefore, after the first spacer layer 103 is formed on the color filter array 102, the plurality of light path changing elements 106 and the plurality of mirrors 105a and 105b may be disposed on the first spacer layer 103. The first spacer layer 103 may be formed of a transparent material, e.g., polydimethylsiloxane (PDMS).

According to the present embodiment, the one light path changing element 106 and the one mirror 105b may correspond to the three color filters 102a, 102b, and 102c. Therefore, the overall width of a set of the light path changing element 106 and the mirror 105b may be identical to a sum of widths of the corresponding three color filters 102a, 102b, and 102c. Furthermore, as shown in FIG. 1, the one set of the light path changing element 106 and the mirror 105b may be shifted with respect to the corresponding color filters 102a, 102b, and 102c. The amount of shift may vary based on a degree by which the light path changing element 106 tilts a light traveling direction. For example, the one set of the light path changing element 106 and the mirror 105b may be shifted by about half of one pixel width with respect to the corresponding color filters 102a, 102b, and 102c.

The plurality of micro lenses 108 for concentrating a light incident from outside of the image sensor 100 to corresponding light path changing elements 106 may be disposed on the mirror layer 105 and may be apart from the mirror layer 105. To maintain a constant distance between the mirror layer 105 and the micro lenses 108, a second spacer layer 107 may be disposed between the mirror layer 105 and the micro lenses 108. In other words, after the second spacer layer 107 is formed on the mirror layer 105, the micro lenses 108 may be disposed on the second spacer layer 107. Like the first spacer layer 103, the second spacer layer 107 may be formed of a transparent material, e.g., polydimethylsiloxane (PDMS).

As shown in FIG. 1, each of the light path changing elements 106 may be disposed to face the center of the corresponding micro lens 108, and a distance between the light path changing element 106 and the micro lens 108 may be similar to a focal length of the micro lens 108. For example, a distance between the light path changing element 106 and the micro lens 108 may be set, such that a beam diameter of a beam concentrated by the micro lens 108 may be almost identical to or smaller than a width of the light path changing element 106.

According to the present embodiment, the one micro lens 108 may correspond to the three color filters 102a, 102b, and 102c. For example, if the plurality of micro lenses 108 are disposed without an interval therebetween, a width of the one micro lens 108 may be identical to a sum of widths of the three color filters 102a, 102b, and 102c. Furthermore, if there is a small interval between the two micro lenses 108 adjacent to each other, a width of the one micro lens 108 may be slightly smaller than the sum of widths of the color filters 102a, 102b, and 102c. The micro lens 108 may be shifted with respect to a set of the corresponding color filters 102a, 102b, and 102c. For example, the micro lens 108 may be shifted by a distance that is 1.5 times of a pixel width with respect to the corresponding color filters 102a, 102b, and 102c.

Figure 2:
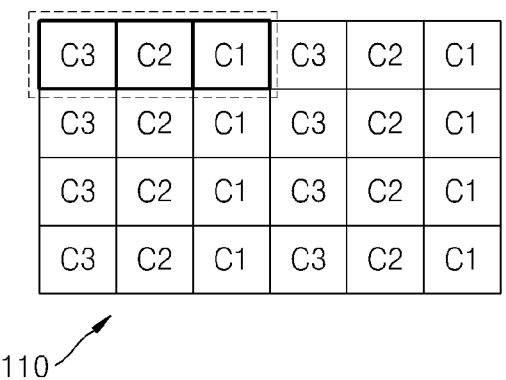
FIG. 2 is a schematic plan view of the structure of a pixel array of the image sensor shown in FIG. 1.

FIG. 2 is a schematic plan view of the structure of a pixel array 110 of the image sensor 100 shown in FIG. 1. Referring to FIG. 2, in the pixel array 110 of the image sensor 100 according to the present embodiment, three pixels for respectively detecting three wavelength band lights C1, C2, and C3 may be alternatively disposed in a single pixel row. Furthermore, the pixel array 110 of the image sensor 100 according to the present embodiment may include a plurality of pixel rows having a same arrangement.

Figure 3:
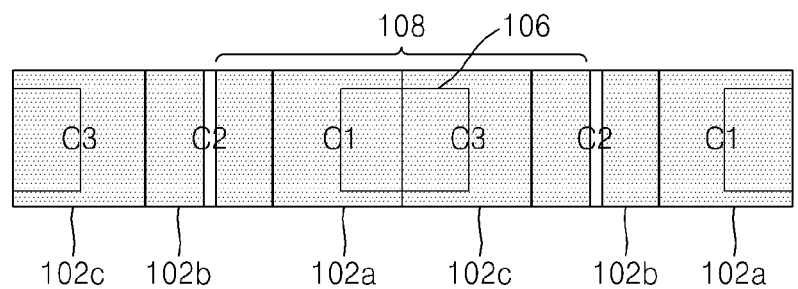
FIG. 3 is a plan view showing a location relationship between a micro lens and a light path changing element in the structure of the pixel array shown in FIG. 2.

Furthermore, FIG. 3 is a plan view showing a location relationship between the micro lens 108 and the light path changing element 106 in the above-stated structure of the pixel array 110. As described above, the light path changing element 106 may be disposed at the center of the micro lens 108 and is shifted by a distance that is a half of one pixel width, with respect to the first color filter 102a. Furthermore, the micro lens 108 is shifted by a distance that is 1.5 times a pixel width with respect to the first color filter 102a. For example, two opposite ends of each of the micro lenses 108 may extend to the centers of two different second color filters 102b. Furthermore, the light path changing element 106 may be disposed to extend from the first color filter 102a to the third color filter 102c.

Referring back to FIG. 1, a light incident from outside the image sensor 100 is concentrated onto the light path changing element 106 by the micro lens 108. The micro lens 108 may concentrate a light incident over three pixel regions onto the one light path changing element 106. Next, as a light traveling direction is tilted by the light path changing element 106, the light is incident to the first color filter 102a. The first color filter 102a transmits the first wavelength band light C1 only and reflects the second and third wavelength band lights C2 and C3. The reflected second and third wavelength band lights C2 and C3 are reflected by the mirror 105b again and are incident to the second color filter 102b. The second color filter 102b transmits the second wavelength band light C2 only and reflects the third wavelength band light C3. Next, the third wavelength band light C3 is reflected by the mirror 105b again and is incident to the third color filter 102c. Finally, the third color filter 102c may transmit the third wavelength band light C3. Each of the transmitted color lights C1, C2, and C3 may be detected by the photo detector 101 and may be converted into electric signals based on intensity.

Meanwhile, for a light concentrated by each of the micro lens 108 to be incident to a corresponding set of the color filters 102a, 102b, and 102c and not to be incident to other sets of the color filters 102a, 102b, and 102c, a vertical barrier 104 may be disposed between two adjacent sets of the color filters 102a, 102b, and 102c. For example, as shown in FIG. 1, on the top surface of the color filter array 102, the barrier 104 may be disposed between the first color filter 102a and the third color filter 102c. In other words, each of the barriers 104 may be disposed to face the light path changing element 106. The barrier 104 may be formed of a light absorbing material or a light reflecting material.

As described above, since the image sensor 100 according to the present embodiment uses the three reflective color filters 102a, 102b, and 102c, most of an incident light may be used for forming an image. Therefore, light loss due to light absorption at the color filter array 102 of the image sensor 100 may be prevented. Furthermore, light utilization efficiency of the image sensor 100 may be improved while embodying high color purity.

Figure 4:
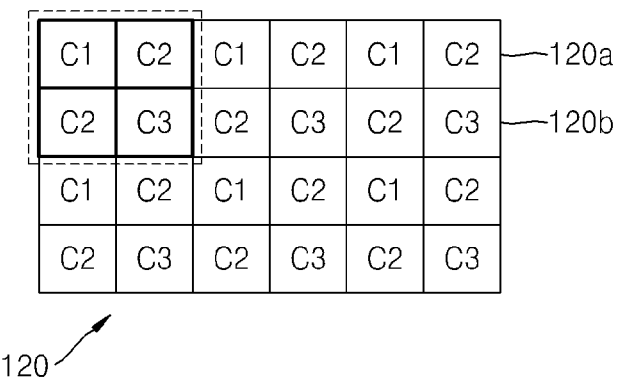
FIG. 4 is a schematic plan view of the structure of a pixel array according to another example embodiment.

FIG. 4 is a schematic plan view of the structure of a pixel array 120 according to another example embodiment. Referring to FIG. 4, the pixel array 120 according to the present embodiment has a common array structure including the Bayer pattern. For example, at a first pixel row 120a of the pixel array 120, a plurality of first pixels for detecting the first wavelength band light C1 and a plurality of second pixels for detecting the second wavelength band light C2 are alternately disposed. Next, at a second pixel row 120b, a plurality of second pixels for detecting the second wavelength band light C2 and a plurality of third pixels for detecting the third wavelength band light C3 are alternately disposed. In the pixel array 120, the first pixel rows 120a and the second pixel rows 120b may be alternately disposed in the vertical direction. Therefore, in the four pixels indicated by dotted lines in FIG. 4, two second pixels are disposed in a diagonal direction, whereas a first pixel and a third pixel are disposed in another diagonal direction.

In the embodiment shown in FIG. 1, each micro lens 108 and each light path changing element 106 correspond to the three color filters 102a, 102b, and 102c. However, in the pixel array 120 shown in FIG. 4, each micro lens 108 and each light path changing element 106 may correspond to two color filters. For example, FIG. 5 is a schematic plan view showing a location relationship between the micro lens 108 and the light path changing element 106 in the structure of the pixel array 120 shown in FIG. 4, FIG. 6 is a schematic sectional view of the first pixel rows 120a, obtained along a line a-a' of FIG. 5, and FIG. 7 is a schematic sectional view of the second pixel rows 120b, obtained along a line b-b' of FIG. 5.

Figure 5:
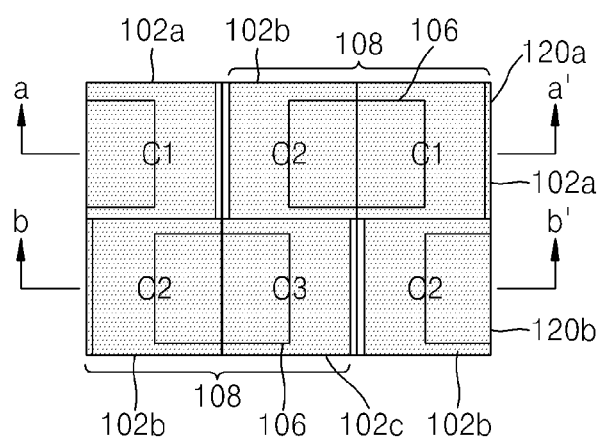
FIG. 5 is a schematic plan view showing a location relationship between the micro lens and the light path changing element in the structure of the pixel array shown in FIG. 4.
Figure 6:
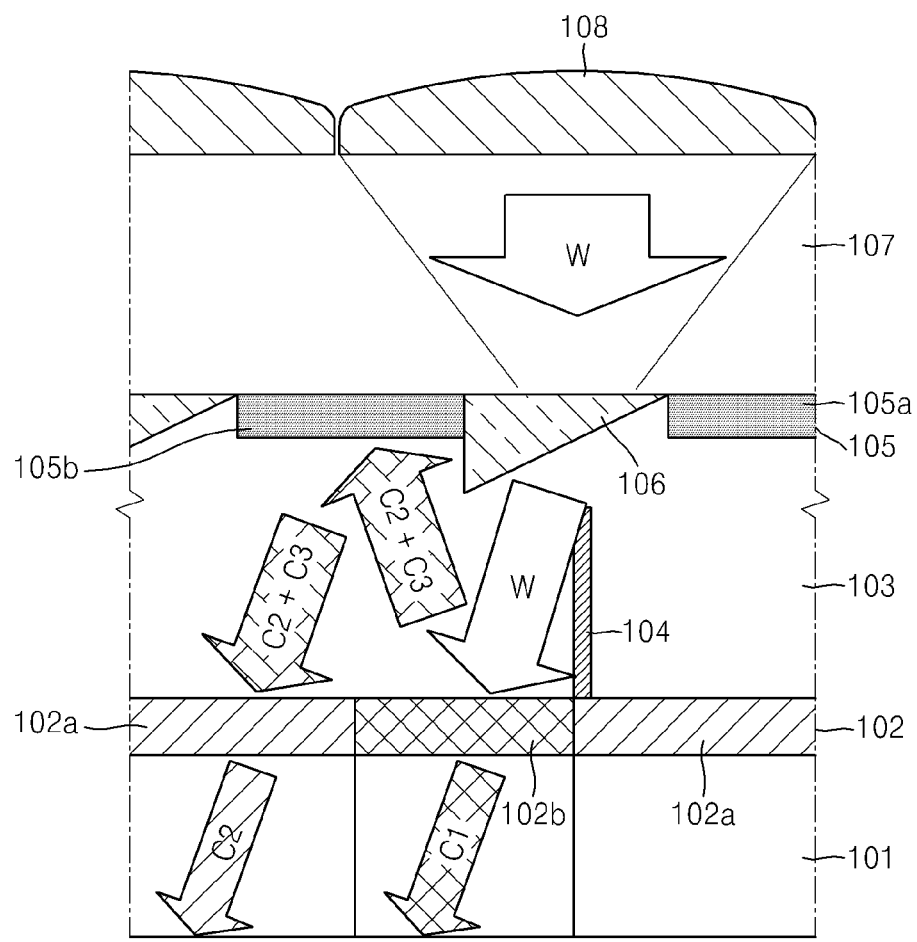
FIG. 6 is a schematic sectional view of a first color filter, obtained along a line a-a' of FIG. 5.

First, referring to FIGS. 5 and 6, each micro lens 108 and each light path changing element 106 may be disposed to correspond to the first color filter 102a and the second color filter 102b at the first pixel row 120a. In the present embodiment, the light path changing element 106 may be shifted by about half of one pixel width with respect to a set of the corresponding first color filter 102a and the second color filter 102b. Therefore, the light path changing element 106 may be disposed to partially overlap the second color filter 102b of the corresponding set of color filters and the first color filter 102a of another set of color filters. Furthermore, the micro lens 108 may be shifted by about one pixel width with respect to a set of the corresponding first color filter 102a and the second pixel row 120b. For example, each of the micro lenses 108 may be disposed to cover the second color filter 102b of a set of corresponding color filters, the corresponding light path changing element 106, and the first color filter 102a of another set of color filters. Furthermore, for a light concentrated by each of the micro lens 108 to be incident to a corresponding set of the color filters 102a and 102b and not to be incident to other sets of the color filters 102a and 102b, a vertical barrier 104 may be disposed between two adjacent sets of the color filters 102a and 102b.

Figure 7:
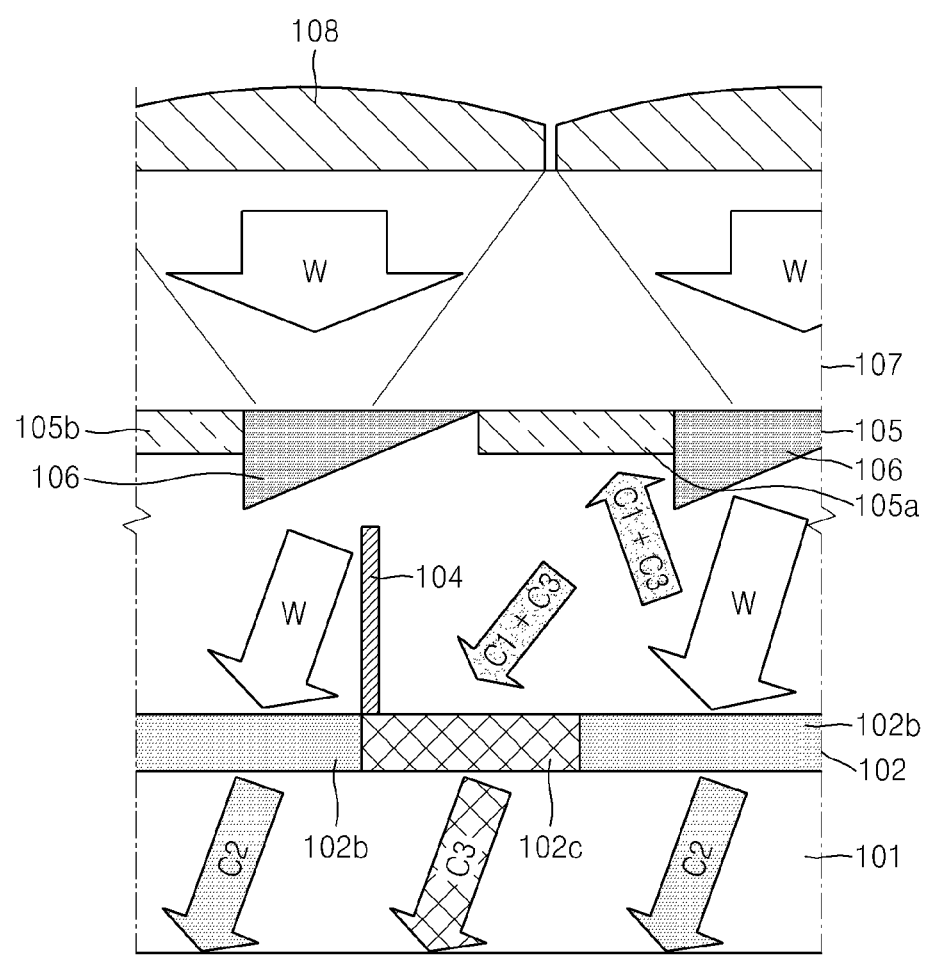
FIG. 7 is a schematic sectional view of a second color filter, obtained along a line b-b' of FIG. 5

Furthermore, referring to FIGS. 5 and 7, each micro lens 108 and each light path changing element 106 may be disposed to correspond to the second color filter 102b and the third color filter 102c at the second pixel row 120b. In the present embodiment, the light path changing element 106 may be shifted by about half of one pixel width with respect to a set of the corresponding second color filter 102b and the third color filter 102c. Therefore, the light path changing element 106 may be disposed to partially overlap the second color filter 102b of the corresponding set of color filters and the third color filter 102c of another set of color filters. Furthermore, the micro lens 108 may be shifted by about one pixel width with respect to a set of the corresponding second color filter 102b and the second pixel row 120b. For example, each of the micro lenses 108 may be disposed to cover the second color filter 102b of a set of corresponding color filters, the corresponding light path changing element 106, and the third color filter 102c of another set of color filters. Furthermore, for a light concentrated by each of the micro lens 108 to be incident to a corresponding set of the color filters 102a and 102b and not to be incident to other sets of the color filters 102a and 102b, a vertical barrier 104 may be disposed between two adjacent sets of the color filters 102a and 102b.

Furthermore, as shown in FIG. 5, the light path changing element 106 and the micro lens 108 of the first pixel row 120a may be disposed to be alternated with the light path changing element 106 and the micro lens 108 of the second pixel row 120b. For example, the light path changing element 106 and the micro lens 108 of the first pixel row 120a may be shifted by one pixel width with respect to the light path changing element 106 and the micro lens 108 of the second pixel row 120b. As a result, the light path changing element 106 of the first pixel row 120a and the light path changing element 106 of the second pixel row 120b may be disposed on the first spacer layer 103 without any interference between each other.

In the embodiment shown in FIG. 4, the first pixel row 120a absorbs or reflects the third wavelength band light C3 and the second pixel row 120b absorbs or reflects the first wavelength band light C1, and thus the overall light utilization efficiency of an image sensor may be reduced compared to the embodiment shown in FIG. 1. However, high color purity may be embodied by employing a Bayer pattern.

Figure 8:
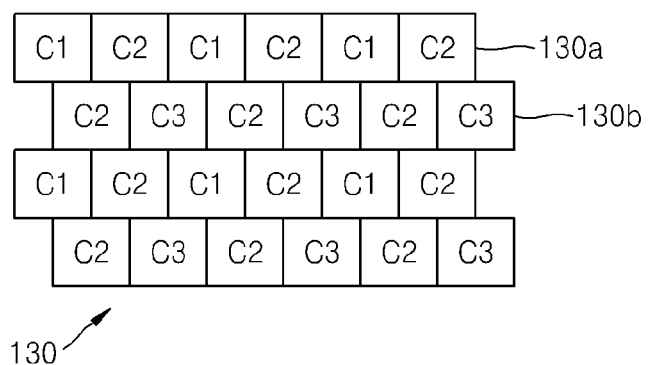
FIG. 8 is a schematic plan view of the structure of a pixel array according to another example embodiment.

FIG. 8 is a schematic plan view of the structure of a pixel array 130 according to another example embodiment. Referring to FIG. 8, in the pixel array 130 according to the present embodiment, a first pixel row 130a may be shifted with respect to a second pixel row 130b. For example, the first pixel row 130a may be shifted by about half of one pixel width with respect to the second pixel row 130b. The other configuration of the pixel array 130 shown in FIG. 8 may be identical to those of the pixel array 120 shown in FIG. 4. However, in the pixel array 110 shown in FIG. 2, two adjacent pixel rows may be shifted with respect to each other.

Figure 9:
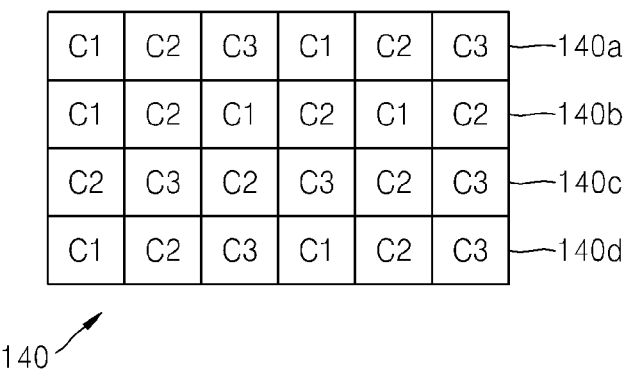
FIG. 9 is a schematic plan view of the structure of a pixel array according to another example embodiment.

FIG. 9 is a schematic plan view of the structure of a pixel array 140 according to another example embodiment. The pixel array 140 according to the present embodiment may include two different pixel pattern structures. For example, a first pixel row 140a and a fourth pixel row 140d of the pixel array 140 shown in FIG. 9 may have the same pixel pattern structure as the pixel array 110 shown in FIG. 2. In other words, at the first pixel row 140a and the fourth pixel row 140d, three pixels for detecting three different wavelength band lights C1, C2, and C3 may be alternately disposed. Furthermore, a second pixel row 140b and a third pixel row 140c may have the same pixel pattern structure as the pixel array 120 shown in FIG. 4. For example, at the second pixel row 140b, a plurality of first pixels for detecting the first wavelength band light C1 and a plurality of second pixels for detecting the second wavelength band light C2 may be alternately disposed. Furthermore, at the third pixel row 140c, a plurality of second pixels for detecting the second wavelength band light C2 and a plurality of third pixels for detecting the third wavelength band light C3 may be alternately disposed.

In the structure, the cross-sections of the first pixel row 140a and the fourth pixel row 140d may be identical to that shown in FIG. 1, the cross-section of the second pixel row 140b may be identical to that shown in FIG. 6, and the cross-section of the third pixel row 140c may be identical to that shown in FIG. 7. In this case, sizes of the micro lenses 108 disposed at the first pixel row 140a and the fourth pixel row 140d may be different from sizes of the micro lenses 108 disposed at the second pixel row 140b and the third pixel row 140c. Although FIG. 9 shows only two different pixel pattern structures, the pixel array 140 may include three or more pixel pattern structures.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope of example embodiments as defined by the following claims.

What is claimed is:

1. An image sensor comprising:
   a color filter array including a plurality of color filters configured to transmit lights of different wavelengths, the plurality of color filters being adjacent to one another;
   a mirror layer including a plurality of mirrors facing the color filter array such that reflective surfaces of the plurality of mirrors face toward the color filter array;
   a plurality of transparent light path changing elements, disposed alternately with the mirrors in the mirror layer, the plurality of transparent light path changing elements configured to tilt a light traveling direction; and
   a plurality of micro lenses configured to concentrate an incident light onto the plurality of light path changing elements, respectively,
   wherein the plurality of color filters are configured to transmit lights of corresponding wavelength bands only and reflect lights of other wavelength bands.

2. The image sensor of claim 1, wherein each of the plurality of light path changing elements comprises a flat light incident surface and a tilted light exit surface.

3. The image sensor of claim 1, further comprising a transparent first spacer layer between the color filter array and the mirror layer,
   wherein the plurality of mirrors and the plurality of light path changing elements are on the first spacer layer.

4. The image sensor of claim 1, further comprising a transparent second spacer layer between the mirror layer and the plurality of micro lenses.

5. The image sensor of claim 1, further comprising a plurality of light-absorbing or light-reflecting barriers vertically disposed on a top surface of the color filter array to face the plurality of light path changing elements.

6. The image sensor of claim 1, wherein the color filter array comprises:
   a first color filter configured to transmit a first wavelength band light only and reflect other wavelength band lights;
   a second color filter configured to transmit a second wavelength band light only and reflect other wavelength band lights; and
   a third color filter configured to transmit a third wavelength band light only and reflect other wavelength band lights, and
   the plurality of first through third color filters are alternate.

7. The image sensor of claim 6, wherein a sum of a width of one light path changing element and a width of one mirror is identical to a sum of widths of the first through third color filters.

8. The image sensor of claim 7, wherein each of the light path changing elements is shifted by about half of one pixel width with respect to a corresponding color filter.

9. The image sensor of claim 7, wherein each of the light path changing elements faces a center portion of a corresponding micro lens and partially overlaps a first color filter and a third color filter.

10. The image sensor of claim 6, wherein each of the micro lenses is shifted by a distance that is 1.5 times a pixel width with respect to a corresponding color filter.

11. The image sensor of claim 10, wherein two opposite ends of each of the micro lenses extend to centers of two different second color filters.

12. The image sensor of claim 6, wherein the color filter array comprises a plurality of pixel rows in which the plurality of first through third color filters alternate, and
   two pixel rows adjacent to each other are shifted by about half of one pixel width with respect to each other.

13. The image sensor of claim 1, wherein the color filter array comprises:
   a first pixel row including a plurality of first color filters configured to transmit a first wavelength band light only and reflect other wavelength band lights and a first plurality of second color filters configured to transmit a second wavelength band light only and reflecting other wavelength band lights, the first color filters the first plurality of second color filters alternating in the first pixel row; and
   a second pixel row including a second plurality of second color filters configured to transmit the second wavelength band light only and reflect the other wavelength band lights and a plurality of third color filters configured to transmit a third wavelength band light only and reflect other wavelength band lights, the second plurality of second color filters and the third color filters alternating in the second pixel row.

14. The image sensor of claim 13, wherein each of the light path changing elements is shifted by about half of one pixel width with respect to a corresponding color filter, and
   each of the micro lenses is shifted by about one pixel width with respect to a corresponding color filter.

15. The image sensor of claim 13, wherein each of the light path changing elements partially overlaps one of the second color filters and one of the first color filters at the first pixel row, and
   each of the light path changing elements partially overlaps one of the second color filters and one of the third color filters at the second pixel row.

16. The image sensor of claim 15, wherein each of the micro lenses covers a second color filter and a first color filter at the first pixel row, and
   each of the micro lenses covers one of the second color filters and one of the third color filters at the second pixel row.

17. The image sensor of claim 16, wherein the light path changing element and the micro lens of the first pixel row alternate with the light path changing element and the micro lens of the second pixel row.

18. The image sensor of claim 1, wherein the pixel array comprises at least two types of pixel pattern structures in which the plurality of color filters are in different patterns.

19. The image sensor of claim 18, wherein the color filter array comprises:
   a first pixel row including a first plurality of first color filters configured to transmit a first wavelength band light only and reflect other wavelength band lights, a first plurality of second color filters configured to transmit a second wavelength band light only and reflect other wavelength band lights, and a first plurality of third color filters configured to transmit a third wavelength band light only and reflect other wavelength band lights, the first pluralities of first, second and third color filters alternating;
a second pixel row including a second plurality of first color filters and a second plurality of second color filters alternating; and
a third pixel row including a third plurality of second color filters and a second plurality of third color filters alternating.

20. The image sensor of claim 19, wherein a size of micro lenses disposed at the first pixel row is different from a size of micro lenses disposed at the second pixel row and the third pixel row.

\* \* \* \* \*